(12) United States Patent
Herrmann et al.

(10) Patent No.: US 8,790,808 B2
(45) Date of Patent: Jul. 29, 2014

(54) DEVICE FOR COOLING A VEHICLE BATTERY

(75) Inventors: Hans-Georg Herrmann, Stuttgart (DE);
Florian Moldovan, Stuttgart (DE);
Caroline Schmid, Stuttgart (DE);
Thomas Schiehlen, Altheim (DE);
Tobias Isermeyer, Loewenstein (DE);
Martin Steinbach, Waiblingen (DE);
Juergen Eckstein, Schwaikheim (DE);
Christoph Fehren-Bacher, Stuttgart (DE); Achim Wiebelt, Steinheim (DE);
Markus Kohlberger, Stuttgart (DE);
Conrad Pfender, Besigheim (DE);
Thomas Heckenberger, Leinfelden-Echterdingen (DE)

(73) Assignee: Behr GmbH & Co. KG, Stuttgart (DE)

( * ) Notice: Subject to any disclaimer, the term of this patent is extended or adjusted under 35 U.S.C. 154(b) by 192 days.

(21) Appl. No.: 12/960,796

(22) Filed: Dec. 6, 2010

(65) Prior Publication Data
US 2011/0132580 A1    Jun. 9, 2011

Related U.S. Application Data

(63) Continuation of application No. PCT/EP2009/003916, filed on Jun. 2, 2009.

(30) Foreign Application Priority Data

Jun. 6, 2008 (DE) .......................... 10 2008 027 293

(51) Int. Cl.
*H01M 10/50* (2006.01)
*H01M 6/50* (2006.01)

(52) U.S. Cl.
USPC ...................................... 429/120; 165/104.33

(58) Field of Classification Search
USPC ............................ 429/120, 156, 151, 72, 433
See application file for complete search history.

(56) References Cited

U.S. PATENT DOCUMENTS

| 4,574,112 A | 3/1986 | Breault et al. |
| 7,264,901 B2 | 9/2007 | Gow et al. |
| 2004/0142238 A1 * | 7/2004 | Asahina et al. ............... 429/176 |

(Continued)

FOREIGN PATENT DOCUMENTS

| AT | 0009 922 U1 | 5/2008 |
| DE | 34 45 191 C2 | 7/1985 |

(Continued)

OTHER PUBLICATIONS

Annotated Fig. 2 of Desai (US 2005/0006068, Published Jan. 13, 2005).*

(Continued)

*Primary Examiner* — Basia Ridley
*Assistant Examiner* — Caitlin Wilmot
(74) *Attorney, Agent, or Firm* — Muncy, Geissler, Olds & Lowe, P.C.

(57) ABSTRACT

A device for cooling a vehicle battery is provided that includes a plurality of electrical storage elements, and a cooling element having ducts for a fluid to flow through, wherein the electrical storage elements are in thermal contact with the cooling elements and heat can be transmitted from the storage elements to the fluid, and wherein the cooling element which comprises the ducts is embodied as at least one extruded profile.

15 Claims, 9 Drawing Sheets

(56) References Cited

U.S. PATENT DOCUMENTS

| | | | |
|---|---|---|---|
| 2004/0200604 A1* | 10/2004 | Fang et al. | 165/140 |
| 2005/0006068 A1* | 1/2005 | Desai et al. | 165/140 |
| 2005/0170241 A1 | 8/2005 | German et al. | |
| 2007/0009787 A1 | 1/2007 | Straubel et al. | |
| 2008/0305388 A1* | 12/2008 | Haussman | 429/120 |
| 2009/0059528 A1 | 3/2009 | Damsohn et al. | |
| 2009/0214940 A1* | 8/2009 | Haussmann | 429/120 |
| 2009/0297936 A1* | 12/2009 | Nemoto et al. | 429/152 |

FOREIGN PATENT DOCUMENTS

| | | | | |
|---|---|---|---|---|
| DE | 195 03 085 A1 | 9/1996 | | |
| DE | 102 03 918 A1 | 8/2003 | | |
| DE | 10238235 A1 * | 3/2004 | | H01M 10/50 |
| DE | 103 05 031 A1 | 9/2004 | | |
| DE | 10 2004 005 394 A1 | 8/2005 | | |
| DE | 10 2006 045 564 A1 | 4/2008 | | |
| DE | 10 2007 021 293 A1 | 11/2008 | | |
| EP | 1 906 126 A2 | 4/2008 | | |
| JP | 11 213976 A | 8/1998 | | |
| TW | 523949 B | 3/2003 | | |
| TW | 544965 B | 8/2003 | | |
| WO | WO 02/27816 A1 | 4/2002 | | |
| WO | WO 2008/007767 A1 | 1/2008 | | |
| WO | WO 2008007767 A1 * | 1/2008 | | |
| WO | WO 2008/018374 A1 | 2/2008 | | |

OTHER PUBLICATIONS

Annotated Fig. 2A of Desai (US 2005/0006068, Published Jan. 13, 2005).*

Annotated Fig. 2B of Desai (US 2005/0006068, Published Jan. 13, 2005).*

Annotated Fig. 2C of Desai (US 2005/0006068, Published Jan. 13, 2005).*

Machine Translation of Geisse et al. (DE 10238235, Published Mar. 2004, pp. 1-14).*

Chinese Office Action for Chinese Application No. 20090121367.6 dated Jan. 28, 2013 with English translation.

* cited by examiner

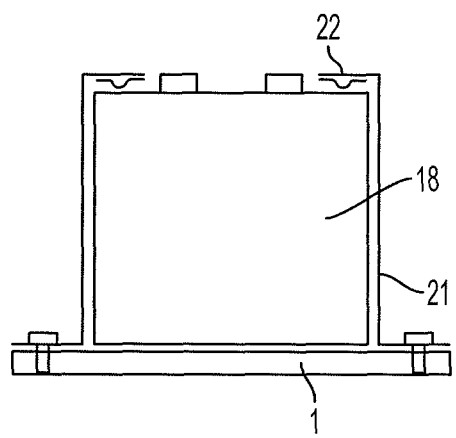
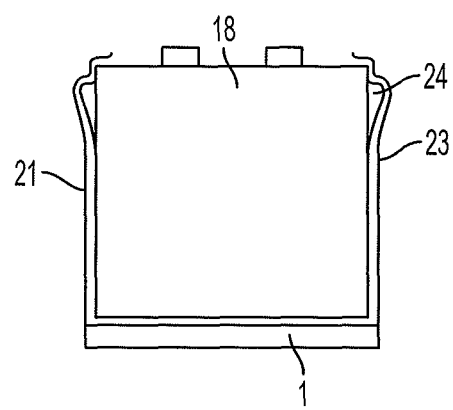
FIG. 24        FIG. 25
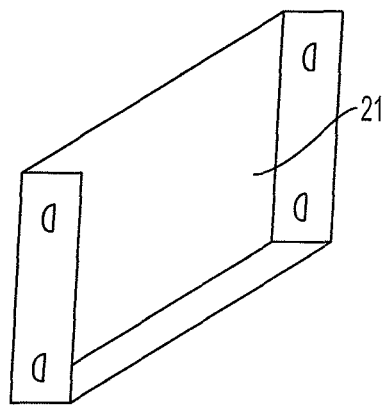
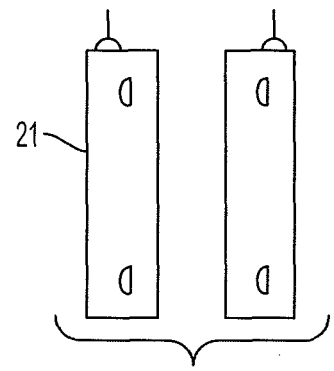
FIG. 26        FIG. 27
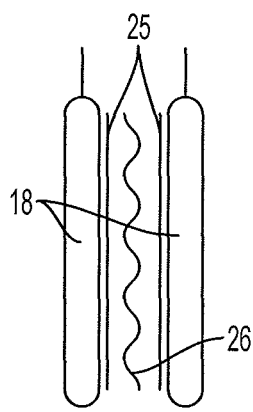
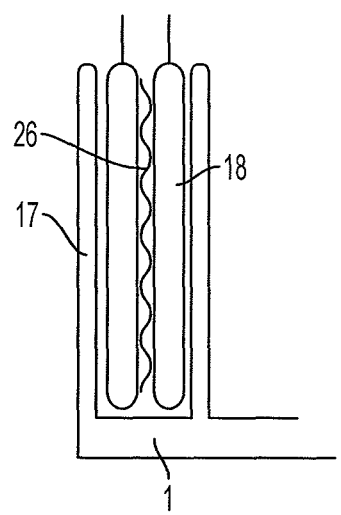
FIG. 28        FIG. 29

DEVICE FOR COOLING A VEHICLE BATTERY

This nonprovisional application is a continuation of International Application No. PCT/EP2009/003916, which was filed on Jun. 2, 2009, and which claims priority to German Patent Application No. DE 10 2008 027 293.0, which was filed in Germany on Jun. 6, 2008, and which are both herein incorporated by reference.

BACKGROUND OF THE INVENTION

1. Field of the Invention

The invention concerns a device for cooling a vehicle battery.

2. Description of the Background Art

The cooling of electrical energy storage devices of modern motor vehicles poses special demands on account of the sometimes high power density. Such energy storage devices can be used as batteries for electric or hybrid vehicles, among other uses. These can be lithium-ion batteries, supercaps, fuel cells, conventional rechargeable batteries, or combinations of such elements. A number of proposals for efficient cooling of such components are known, although these are often laborious or costly to produce. For example, cooling plates for electric elements have been proposed that are assembled from two halves, with passages for conducting a coolant being introduced into one of the halves by milling.

SUMMARY OF THE INVENTION

It is an object of the invention is to provide a device for cooling a motor vehicle battery that can be manufactured easily and economically, and that provides effective and reliable cooling. As a result of the fact that the cooling element including the passages is designed as at least one extruded profile, production costs can be kept low since the number of joints, and thus of manufacturing steps and possible sources of leakage, is reduced. At the same time, an extruded profile with passages provided therein offers high pressure resistance, which can be advantageous in particular when the cooling element is used as the evaporator of a refrigeration circuit.

In an embodiment, the fluid is a coolant of a cooling circuit. Alternatively or in addition, the coolant can also be a refrigerant of a refrigeration circuit, wherein the cooling element is designed as the evaporator for the refrigerant. A coolant is hereinafter understood to be a heat-transmitting fluid, in particular but not necessarily in the liquid phase, which undergoes virtually no phase change when flowing through the cooling element. In the case of a refrigerant in the sense used by the detail designs according to the invention, an evaporation of the refrigerant generally takes place in the cooling element, wherein the cooling element is a component of a refrigeration circuit with a compressor, gas cooler/condenser, and expansion element. In this context, the refrigeration circuit can include an air conditioning system of the vehicle, in particular.

In an embodiment, the cooling element can be multiple flow, in particular dual flow, in design, wherein a first fluid flows through some of the passages and a second fluid flows through other passages. This makes it possible, for example, to connect both to a cooling circuit with a first fluid as circulating coolant, as well as to a refrigeration circuit with the second fluid as circulating refrigerant. In this way, it is possible to ensure cooling in different operating situations, in particular when the vehicle air conditioner is switched off or faulty.

The extruded profile can have at least one region in its cross-section that is not traversed by passages, in particular for fastening the electrical elements. In especially advantageous manner, the region of the cooling element that is not traversed by passages can have a smaller outer diameter than the region that is traversed by passages in this design. The thinner region thus contributes to saving weight and material, and at the same time can be used for fastening the electrical elements or retaining members for the elements, for instance by means of holes or internal threads. In particular, such an embodiment can be designed in a simple manner such that the cooling element has a few, in particular just one, extruded profile.

A header can be arranged on the cooling element for distributing the fluid over the multiple passages, wherein the header is provided at the end of the extruded profile and at least some of the passages terminate in the header.

In an embodiment, the header can have a baffle extending in its longitudinal direction, in particular wherein chambers of the header separated by the baffle are associated with different passages of the cooling element. A header with a baffle of this nature can thus allow the distribution of different fluids over different groups of passages.

Alternatively or in addition, the header can have a baffle extending in its transverse direction. Such a header allows, in a simple way, arrangements in which one or more reversals of the fluid's direction take place at the ends of the extruded profile, for example in the case where the flow through the cooling element is in a serpentine pattern.

To ensure especially even distribution of the fluid over the multiple passages, the header can have a variable cross-section in the fluid's flow direction. In this context, the variable cross-section can be designed in a simple way by a variable penetration depth of the cooling element in the header.

In an embodiment, the header can have a first chamber and a second chamber, wherein the chambers are arranged one behind the other in the longitudinal direction of the flow passages, and the ends of a first group of flow passages for connection to the first chamber extend past a second group of flow passages that are connected to the second chamber. Such a construction permits, in particular, nearly any desired association of the different passages with two separate flows of the cooling element.

Alternatively or in addition to the provision of a header, a manifold block for supplying one or more fluids can be located on the cooling element, wherein the manifold block is connected to the passages through openings provided perpendicular to at least some of the passages. For a manifold block as well, provision can be made in a possible embodiment for the manifold block to include at least two flows.

In an embodiment, the cooling element can comprise multiple extruded profiles, wherein at least one, in particular a plurality, of the passages is formed in each of the extruded profiles. In this way, cooling elements of varying width can be implemented by using identical parts, among other techniques.

In another embodiment of the invention, the path of the cooling element can be curved or bent. This is accommodated especially well by the use of extruded profiles with passages integrally formed therein of the same material, since there are no joints in the vicinity of the bends that could be damaged. It is especially preferred here for the cooling element to have at least one, in particular multiple, bends about approximately 180°, wherein the electrical storage elements are arranged between parallel, flat sections of the cooling element. Among other things, this allows two opposing sides of a storage element, for example of a flat battery such as those in the "coffee bag" design, to be cooled over their full areas by the two parallel, flat sections. Alternatively or in addition, by means of its bending the cooling element can also be matched to a cylindrical surface shape of a storage element, in particular, in order to optimize the size of the thermal contact area.

In another embodiment, the cooling element can have a prismatic element with walls for accommodating the electrical storage elements. It is especially preferred in this design for the prismatic element to be enclosed by the extruded profile as a single piece and in the same material, which is to say to simultaneously be a constituent part of the extruded profile. Depending on requirements, however, it can also be a separate component, for example a component soldered over its area to the cooling element, which can likewise be an extruded profile, particularly in the interests of simple manufacture.

In an embodiment, the electrical elements do not have an inherently rigid envelope, wherein the elements are designed in particular as flat bodies or "coffee-bag" cells. Such designs are used for lithium-ion batteries in particular, which are especially interesting for modern traction batteries because of their power density.

Alternatively or in addition, the electrical elements can have an inherently rigid envelope, wherein the elements are designed as cylindrical bodies in particular. Such cylindrical designs are widespread as well and are also encountered in lithium-ion batteries.

In the interests of easy assembly combined with good thermal contact, the electrical elements can be secured to the cooling element by means of a clamping frame. It is advantageous in this design for the clamping frame to hold one or more of the electrical elements by elastic clamping. In this way the elements can be inserted in a latching manner during assembly or maintenance, wherein a resultant spring force in the direction of a thermal contact surface is also present in the assembled state when the clamping frame is designed suitably.

In an embodiment, the clamping frame is divided into two pieces, wherein an electrical element, which in particular is not inherently rigid, is held between two parts of the clamping frame. By means of two-piece or three-piece clamping frames, "coffee-bag" cells, for example, can be mounted easily and reliably, with a particularly large surface of the cells at the same time being in reliable contact with the thermally conducting, in particular metallic, clamping frame.

In an embodiment, provision is made for two electrical elements, which in particular are not inherently rigid, to be supported by means of a spring element located between them, by which means a thermal contact is improved and expansions due to temperature or charge state of the electrical storage devices are compensated. Such a spring element is understood to include a layer of elastic nonwoven mat or the like in addition to metallic springs made of corrugated sheet metal, for example.

In an embodiment, a plurality of the electrical elements can be joined into a preassembled stack to improve the manufacturing flows and in the interest of controlling costs and quality, wherein the preassembled stack is placed on the cooling element.

In an embodiment, the electrical elements can be secured over their area to a cooling plate that can be attached to the cooling element. It is especially preferred in this regard for the electrical elements to be additionally attached to one or more plastic parts, wherein the cooling plate, the plastic parts, and the electrical elements together form a preassembled stack for attachment to the cooling element.

Depending on the requirements, however, the elements can also be secured directly to the cooling element, for example by gluing.

In another embodiment, the cooling element can have a first flow and at least one second flow that is located in a plane parallel to the first flow. It is preferred in this regard for the first and second flows to be connected together by a diverter block, so that the inlet and outlet can be located on the same side of the cooling element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 24 shows a cross-sectional view of an electrical element secured to the cooling element by means of a clamping frame.

FIG. 25 shows a variation of the exemplary embodiment from FIG. 24.

FIG. 26 shows a three-dimensional view of a clamping frame part for a flat electrical cell.

FIG. 27 shows a top view of two clamping frame parts from FIG. 26.

FIG. 28 shows two flat electrical elements with a spring element located between them.

FIG. 29 shows the electrical elements from FIG. 28 between the retaining walls of a profile.

DETAILED DESCRIPTION

In each case, the electric elements cooled in the exemplary embodiments described below are lithium-ion batteries, while other elements, such as NiMH batteries or supercaps, may also be provided depending on requirements.

Figure 1:
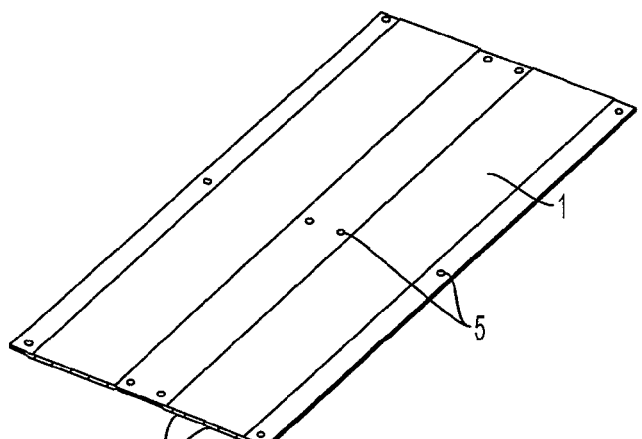
FIG. 1 shows a cooling element from a first exemplary embodiment.
Figure 2:
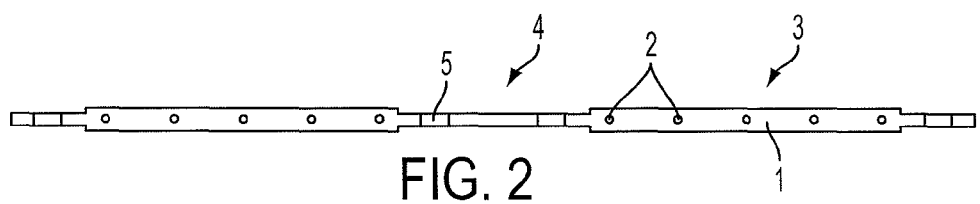
FIG. 2 shows the cooling element from FIG. 1 in a cross-sectional view.

In the first exemplary embodiment shown in FIG. 1 and FIG. 2, the cooling element is designed as an extruded aluminum profile 1 with a plurality of passages 2 arranged next to one another in a transverse direction, which may have a round, polygonal, or other cross-section. Each group of passages 2 constitutes a first region of greater thickness 3 on the cooling element, wherein second regions 4 of smaller thickness are provided between these regions 3 in order to save weight. The second regions are provided with holes 5, by means of which the electrical elements—which are not shown—are affixed to the cooling element, if applicable by additional retaining members.

Figure 2A:
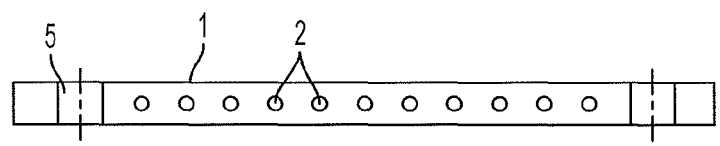
FIG. 2a shows a variation of the cooling element from FIG. 2.

In the variation from FIG. 2a, the extruded profile 1 has a constant thickness, although regions 4 without passages 2 are also present here, mounting holes 5 being placed in these regions.

In particular, multiple battery cells can be positioned next to one another on the cooling elements, not only in the longitudinal direction, but also in the transverse direction.

Figure 3:
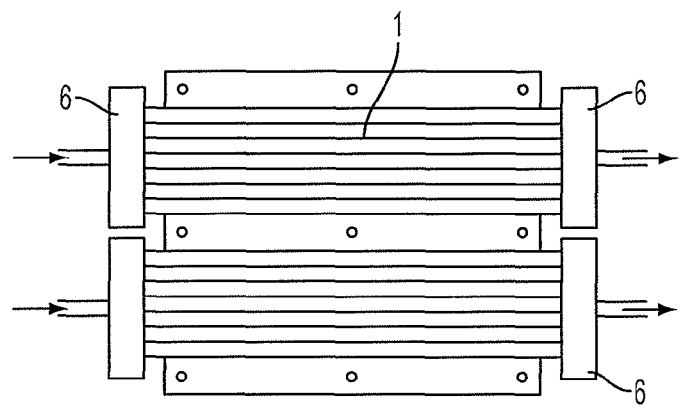
FIG. 3 shows a top view of the cooling element from FIG. 1 with headers arranged thereon.

FIG. 3 shows the cooling element from FIG. 1 with headers 6 arranged on the ends thereof, through which headers a fluid flow is distributed among the passages 2. In the present case, each of the groups of passages in the first regions 3 has both an inlet-side and an outlet-side header 6.

Figure 4:
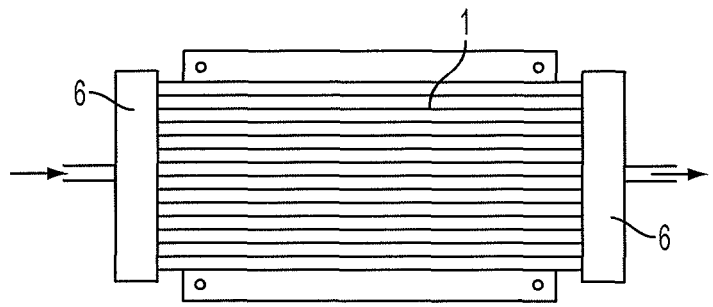
FIG. 4 shows a variation of the arrangement from FIG. 3.

In the variation from FIG. 4, only one inlet-side header and one outlet-side header is present, each of which is connected to all passages.

Figure 5:
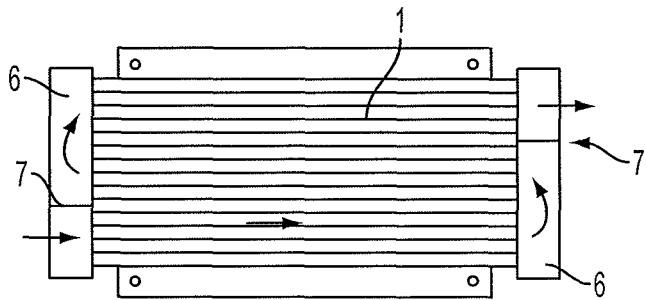
FIG. 5-7 each show additional variations of the arrangement from FIG. 3.
Figure 6:
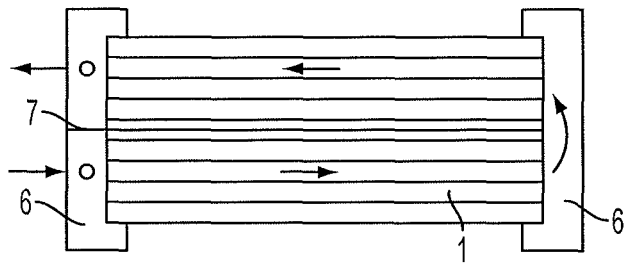

As shown in FIG. 5 and FIG. 6, the headers can have baffles 7 in their transverse direction (the same as the longitudinal direction of the passages or the direction of extrusion) to separate different chambers or sections of the header. This permits a single or even multiple reversals of direction of the fluid flow in the cooling element, so that the cooling element can be designed as a U-flow cooler or even with a flow path having multiple serpentine reversals.

Figure 7:
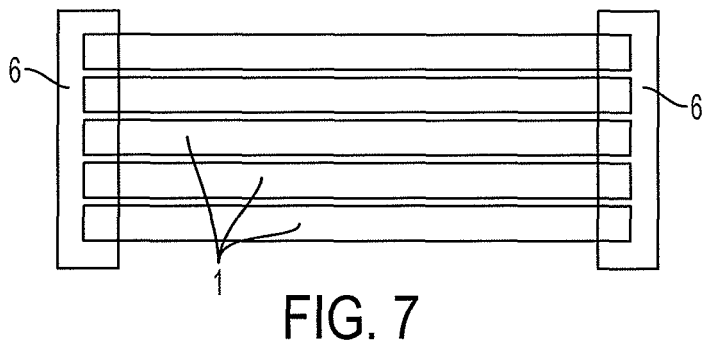

FIG. 7 schematically shows an example in which multiple separate extruded profiles 1 are accommodated on the same header 6. In this way, the shaping of the individual profile elements is less resource-intensive and the cooling element can be designed in different widths with identical parts.

Figure 8:
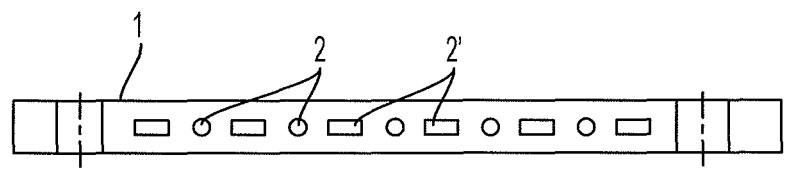
FIG. 8 shows a cross-section through a cooling element with two flows.
Figure 9:
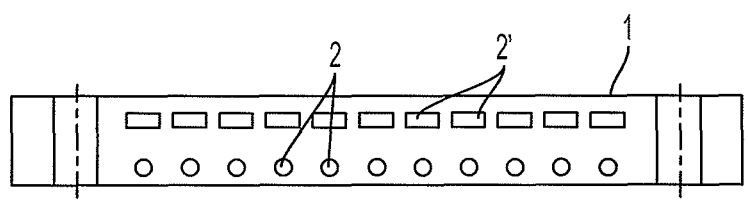
FIG. 9 shows a cross-section through another cooling element with two flows.

FIG. 8 and FIG. 9 show cross-sections of cooling elements with passages 2 of a first flow and passages 2' of a second flow. In the case of FIG. 8, the passage types 2, 2' are arranged next to one another in alternation, and in the case of FIG. 9 they are arranged in parallel rows one below the other.

In addition to a single-flow design, the cooling element can also be implemented as a dual flow design as in FIG. 8 and FIG. 9. A refrigerant such as R134a, $CO_2$, or any other approved refrigerant may be selected as a first fluid here. The header regions have appropriate baffles to implement the desired flow configuration. The number of reversals of direction in this design is not freely selectable inasmuch as the pressure drop in the plate must be taken into account. In particular, when refrigerant flows through the plate, care must be taken that the pressure drop is not too high. The pressure drop determines the evaporation pressure of the refrigerant. Consequently, a pressure drop that is too high results in an uneven temperature distribution in the cooling element. The temperature gradient in the cooling element should not be higher than 5° K. The dual flow design has the advantage that refrigerant and coolant, or two other different fluids, can flow through the plate. This offers advantages, especially when the refrigerant circuit in the vehicle (air conditioner) cannot be operated, for example because of outdoor temperatures that are too low, and thus the electrical element cannot be cooled with the aid of the refrigerant. The coolant then takes over the cooling of the elements here.

In general, the headers can have any desired cross-sectional shape, such as round, oval, rectangular or trapezoidal. Grooves into which the headers are inserted are provided on the end faces or in the end regions of the surface for installation on the cooling element. By means of solder-plating of at least some of the parts, the assembled arrangement can be soldered in a soldering oven, which naturally takes place before an installation of the electrical elements.

Figure 11:
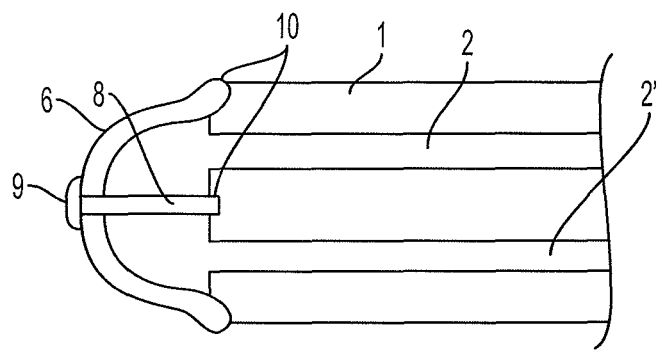
FIG. 11 shows a partial cross-sectional view of the cooling element from FIG. 9 with headers for two flows arranged thereon.
Figure 12:
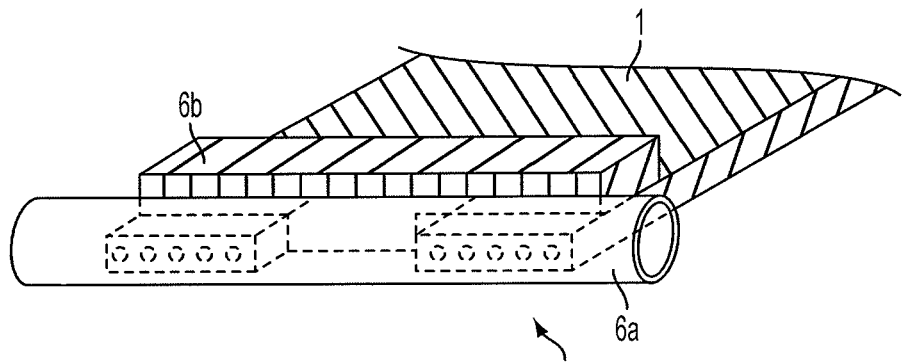
FIG. 12-15 show overall and detail views of another exemplary embodiment of a dual flow cooling element with headers arranged thereon.
Figure 13:
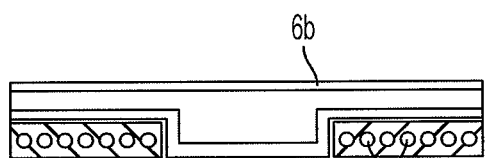
Figure 14:
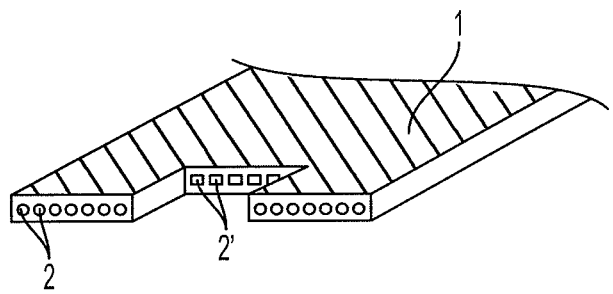
Figure 15:
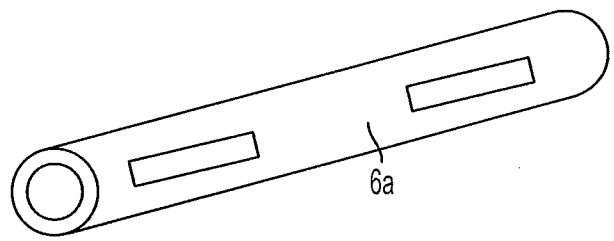

FIG. 11 shows, by way of example, a header such as can be combined with a cooling element from FIG. 9. For separating the two flows or groups of passages 2, 2', the header has a baffle 8 that is continuous in its longitudinal direction and is fixed in place and soldered in a sealed manner by means of holes 9. For assembly, the edges of the header engage grooves 9 on the end of the cooling element 1.

Figure 10:
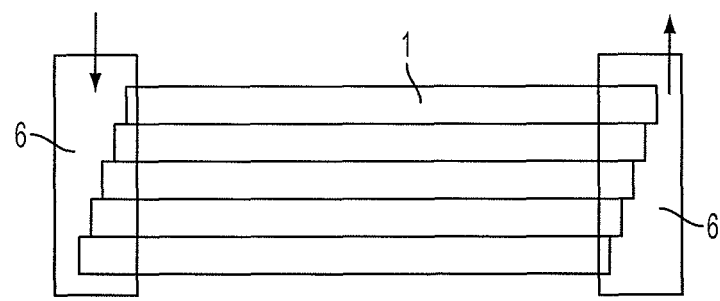
FIG. 10 shows a variation of a cooling element with variable header cross-section.

FIG. 10 shows an exemplary embodiment in which the header has a variable free cross-section over its length by means of cooling elements engaging in it at staggered depths. In this way, it is possible to accommodate the pressure decrease in the fluid over the length of the header and to ensure uniform fluid flow through the cooling element 1, which can also consist of multiple, individual extruded profiles.

FIG. 12 through FIG. 15 show another example of a dual flow device in which the passages 2, 2' of the cooling element are arranged next to one another. In the end region of the cooling element, groups of the passages of the first flow project past groups of passages 2' of the second flow in the longitudinal direction of the cooling element by means of cutting to length. The header 6 is designed in two parts, with a first, tubular header section 6a and a second, stepped, box-like header section 6b. The first passages 2 terminate in slots in the first header section 6a, and the passages 2' of the second flow terminate in the box-like header section 6b. The header sections 6a, 6b are arranged essentially one behind the other in the longitudinal direction of the cooling element. All the parts are sealed together in a soldering process, wherein the fluid-carrying chambers of the header sections 6a, 6b are separated from one another.

Of course, the header 6 can also be designed as a single-piece machined part, in particular a milled part.

Figure 16:
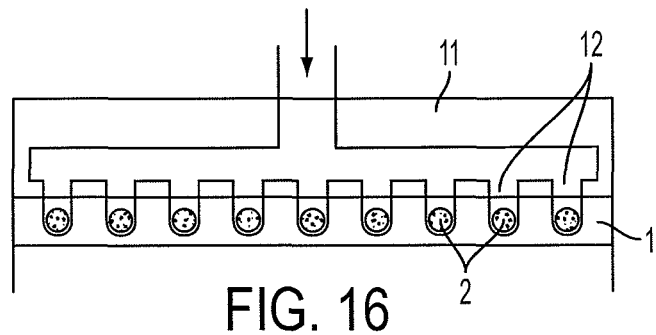
FIG. 16 shows a cross-section through a cooling element with a manifold block.

FIG. 16 shows a manifold block 11, which can be provided instead of or in addition to a header, and which likewise serves to distribute the fluid flow over multiple passages 2. The manifold block 11 is positioned from above on the surface of the cooling element's end region in a sealing manner. In this construction, the channels 2 are closed off at the end face, and provided with vertical tapped holes 12 for connection to the manifold block. In this design, projections of the manifold block can engage in the holes 12 for secure assembly.

Figure 17:
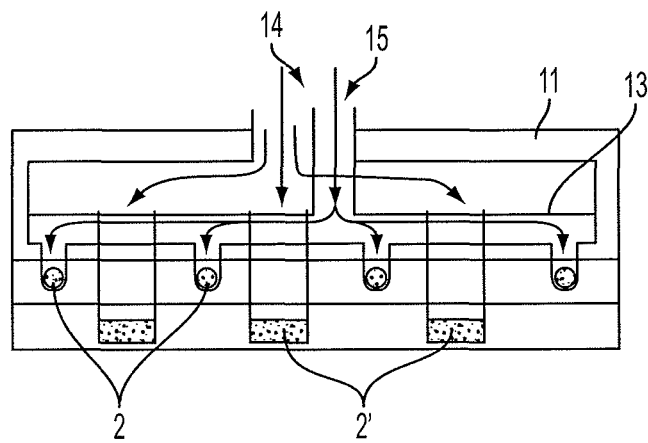
FIG. 17 shows a variation of the arrangement from FIG. 16 with dual-flow manifold block and cooling element.

FIG. 17 shows a dual flow variation of the manifold block from FIG. 16. Here, the manifold block 11 has a baffle 13 extending in the transverse direction, and two feed inlets 14, 15. By means of the manifold block from FIG. 17, it is possible to supply, in particular, passages 2, 2' from separate flows that are arranged in alternation next to one another.

Figure 18:
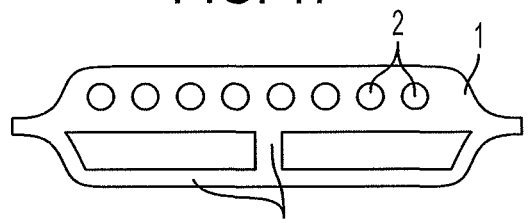
FIG. 18 shows a cross-section through a cooling element with integrated reinforcements.

FIG. 18 shows a cross-section through a modified extruded profile, in which reinforcing ribs 16 are provided to improve the mechanical rigidity of the profile in a lightweight manner.

Figure 19:
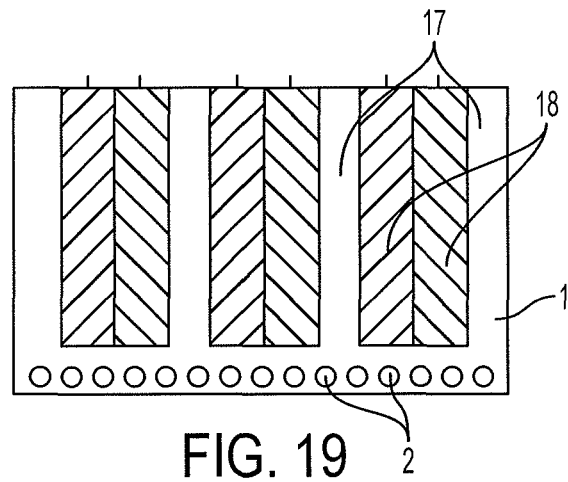
FIG. 19 shows a cooling element with integrated retaining walls for retaining electrical elements.

FIG. 19 shows a modification of a cooling element designed as an extruded profile in which thermally conductive walls 17 project perpendicularly to the cooling element; the electrical elements 18 are held in thermal contact between these walls. A profile of this nature can be designed as a single-piece extruded profile, or be made of two extruded profiles soldered together, of which one includes the passages 2 and the other includes the walls 17.

Figure 20:
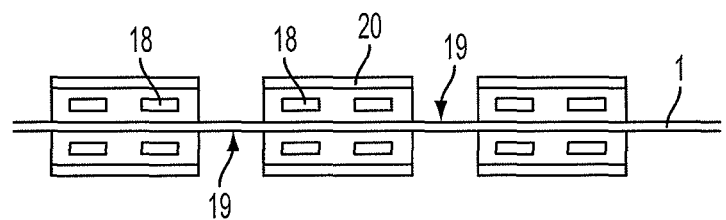
FIG. 20 shows an embodiment with bendable cooling element after a first assembly step.
Figure 21:
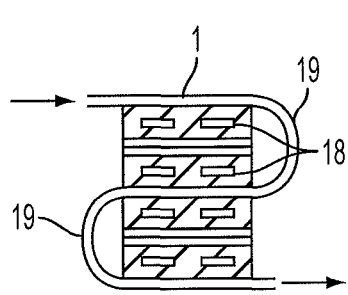
FIG. 21 shows the embodiment from FIG. 20 after a second assembly step.
Figure 22:
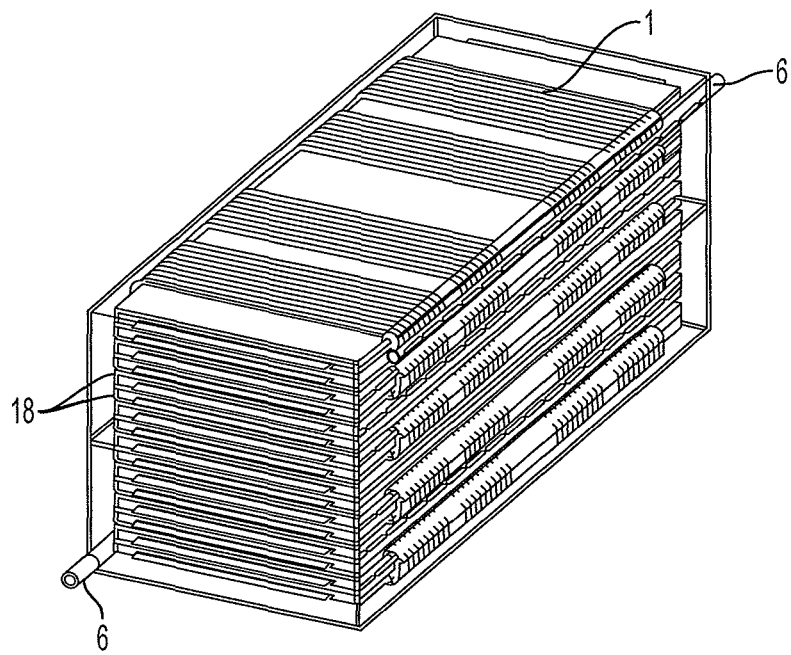
FIG. 22 shows a three-dimensional overall view of the embodiment from FIG. 21.

FIG. 20 through FIG. 22 show a device with a curved or bent cooling element 1. The cooling element is made suitably thin, in order to first attach the electrical elements 18, for example by means of adhesive (see FIG. 20), and then to be bent by 180° at predetermined bending points 19. By folding in alternation (folded cooler), it is thus possible to construct a compact stack of electrical elements, each of which is cooled over its full area on both sides. However, the figures show a variation in which the flat sides of two elements 18 at a time rest against one another, so that each of the elements only has thermal contact on one side with the cooling element 1.

In the present case, the electrical elements are flat lithium-ion cells in the "coffee bag" design, which do not have an inherently rigid envelope. In order to compensate for thermal and charge-related expansion, nonwoven mats 20 are arranged on one side of each of the elements.

FIG. 22 shows a three-dimensional representation of the fully assembled and folded device, wherein a header 6 is provided at each end of the extruded profile. As a whole, this construction is characterized by an especially large thermal contact area along with easy manufacture.

Figure 23:
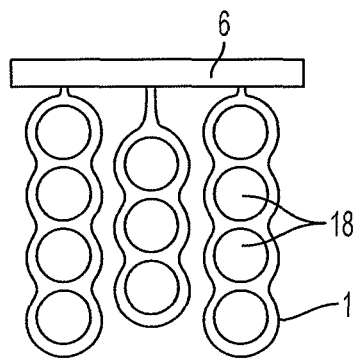
FIG. 23 shows another embodiment with a curved or bent cooling element.

FIG. 23 shows another example of a curved or bent cooling element, in which the element is formed to curved wall sections of battery cells 18 having inherently rigid, cylindrical walls.

FIG. 24 through FIG. 31 each describe retaining members for securing and simultaneously thermally connecting the electrical elements 18 to the cooling element 1.

In FIG. 24, the element is held by means of a resilient clamping frame 21 made of metal, with the clamping frame being screwed to the cooling element 1 and the element 18 being pressed against the cooling element by means of spring elements 22.

FIG. 25 shows a variation in which appropriate shaping of the resilient side walls 23 makes it possible to insert the electrical elements 18 in the clamping frame 21 in a latching manner, wherein, moreover, a resultant pressing force in the direction of the cooling element 1 remains after latching. For this purpose, the electrical elements can have suitable formations 24, for example with canted edges. In particular, in this embodiment the clamping frames can be attached to the cooling element, for example by soldering, prior to insertion of the elements.

FIG. 26 and FIG. 27 show halves of a thermally conductive clamping frame 21, between which can be placed flat lithium-ion batteries that are not inherently rigid, after which the clamping frames are locked together and installed on the cooling element 1.

FIG. 28 shows a retaining member in which two "coffee-bag" cells are adhered to one metal plate each, wherein the metal plates are aligned with respect to one another and a corrugated spring plate 26 is provided between them. As FIG. 29 shows, such an arrangement is especially suitable for being inserted between the walls 17 of the cooling element from FIG. 19 in a clamping manner and in good thermal contact.

Figure 30:
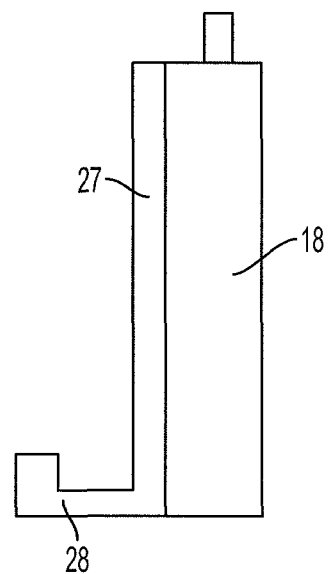
FIG. 30 shows a flat electrical element secured to a cooling plate.

FIG. 30 shows a cooling plate 27 that is glued to a "coffee-bag" cell 18 and can be placed over its area on the cooling element. The connection can be made by screws, for example.

Figure 31:
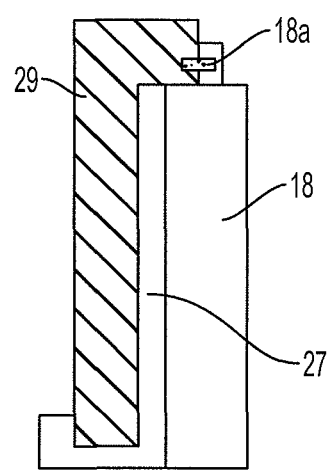
FIG. 31 shows the arrangement from FIG. 30 with an additional plastic retaining member.

FIG. 31 shows the cell 18 and cooling plate 27 from FIG. 30, wherein there is additionally provided a molded plastic part 29 that is clipped to leads 18a of the cell via holes provided there. The molded plastic parts 29 can also have molded features (not shown) for clipping or snapping to one another and to the cooling plates 27, so that a preassembled stack of multiple electrical elements can be produced in a simple manner.

The stack can be placed on the cooling element as a unit and can be attached thereto by screws and/or gluing, for example. This considerably simplifies mass production of an inventive device. At the same time, the leads are held in a defined position, particularly in the case of cells 18 that are not inherently rigid.

It is a matter of course that the individual features of the exemplary embodiments described above can be appropriately combined with one another according to requirements.

Figure 32:
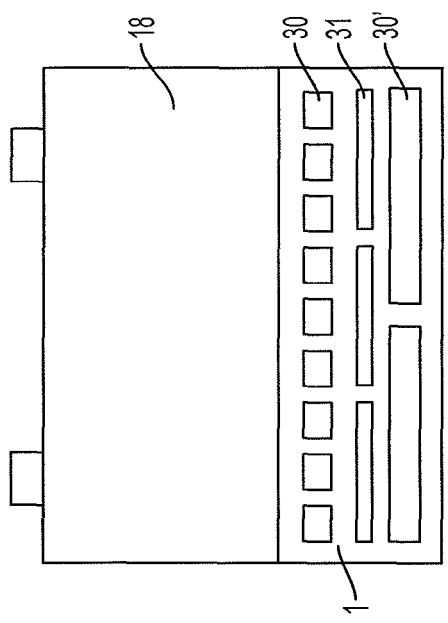
FIG. 32 shows another exemplary embodiment with multiple flows in the cooling element.
Figure 33:
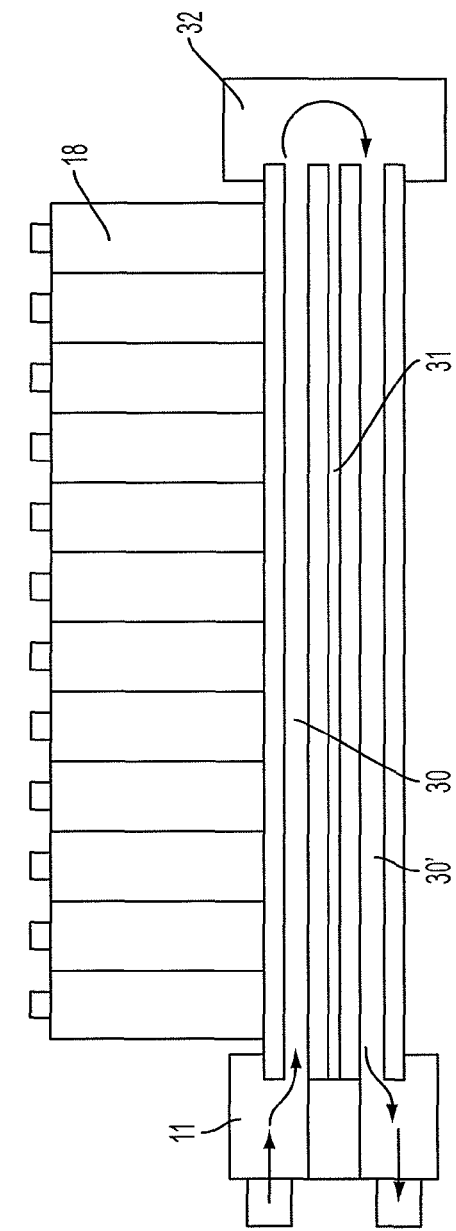
FIG. 33 shows a longitudinal cross-section through the arrangement from FIG. 32.

FIG. 32 and FIG. 33 show another exemplary embodiment of the device in a front view and a longitudinal cross-section.

In this exemplary embodiment, the cooling element 1 is likewise designed as an extruded profile and has a first flow 30 and a second flow 30' that is arranged substantially parallel to the first flow. As indicated by arrows, the first fluid flows into a manifold block 11 and through the first flow 30. It is then returned to the manifold block 11 via a diverter block 32 and a second flow 30', which is located below the first flow.

In this design, the first flow 30 is responsible for cooling the storage elements 18. The second flow 30' serves solely to return the coolant, so that inlet and outlet can be located on the same side of the cooling element 30. The second flow 30' has essentially no effect on the cooling of the storage elements, and is thus designed so that the pressure drop is kept as small as possible.

Located between the first flow 30 and the second flow 30' is a blind passage 31, which has no connection to the manifold block 11 or the diverter block 32. This blind passage serves the purpose of thermal isolation of the two flows 30 and 30', and it is filled with air, for example, or another insulating material.

The blind passage 31 is optional, because in some cases this thermal separation is undesirable in the interests of equalizing the temperature of the cooling element. In this exemplary embodiment, the second flow 30' then likewise takes on a heat-transmitting function.

The important advantages of this embodiment from. FIG. 32 and FIG. 33 are that the inlet and outlet can be located on one side of the cooling element, and the diverter block can be designed as an identical part. If the device is to be fabricated from two or more extruded profiles in another embodiment, for example, then only the manifold block 11 would need to be adapted.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for cooling a vehicle battery, the device comprising:
   a plurality of electrical storage devices; and
   a cooling element having channels for passage of a fluid,
   wherein the electrical storage devices are in thermal contact with the cooling element such that heat is transmittable to the fluid from the storage elements,
   wherein the cooling element including the passages is configured as one extruded profile,
   wherein the cooling element includes a first flow in a first plane and at least one second flow in a second plane, wherein the first plane is substantially parallel to the second plane, and
   wherein the cooling element has walls for accommodating the electrical storage elements between the walls, the walls extending perpendicular to the first and second planes.

2. The device according to claim 1, wherein the cooling element is multiple flow or dual flow, in design, and wherein a first fluid flows through some of the passages and a second fluid flows through other passages.

3. The device according to claim 1, wherein the extruded profile has at least one region in its cross-section that is not traversed by passages for fastening the electrical elements.

4. The device according to claim 1, wherein a header is arranged on the cooling element, and wherein the header is provided at an end of the extruded profile and at least some of the passages terminate in the header.

5. The device according to claim 1, wherein a manifold block configured to supply one or more fluids is arranged on the cooling element, wherein the manifold block is connectable to the passages through openings provided substantially perpendicular to at least some of the passages.

6. The device according to claim 5, wherein the manifold block includes at least two flows.

7. The device according to claim 1, wherein the cooling element comprises multiple extruded profiles, and wherein at least one or a plurality of the passages are formed in each of the extruded profiles.

8. The device according to claim 1, wherein a path of the cooling element is curved or bent.

9. The device according to claim 1, wherein the walls are formed of the same material as and of a single piece with the extruded profile.

10. The device according to claim 1, wherein the electrical storage elements have a rigid envelope, and wherein the elements are configured as cylindrical bodies.

11. The device according to claim 1, wherein two electrical storage elements, which are not rigid, are supported by a spring element arranged between them.

12. The device according to claim 1, wherein a plurality of the electrical storage elements are joined into a preassembled stack, and wherein the preassembled stack is placed on the cooling element.

13. The device according to claim 1, wherein the first flow and the at least one second flow are connectable to one another in a communicating manner by a diverter block.

14. A device for cooling a vehicle battery, the device comprising:
    a plurality of electrical storage element; and
    a cooling element having channels embedded therein for passage of a fluid,
    wherein the electrical storage elements are in thermal contact with the cooling element such that heat is transmittable to the fluid from the storage elements,
    wherein the cooling element, including the passages, is configured as one extruded profile,
    wherein the channels are spaced apart along a width direction of the cooling element, and
    wherein a central region of the cooling element, in the width direction, has a smaller thickness than other regions of the cooling element.

15. The device according to claim 1, wherein the first plane of the first flow is arranged directly adjacent to the second plane of the at least one second flow without any of the electrical storage elements provided therebetween.

* * * * *